(12) United States Patent
Erlandsson et al.

(10) Patent No.: US 8,793,080 B1
(45) Date of Patent: Jul. 29, 2014

(54) SUCKER ROD LOAD MEASUREMENT

(75) Inventors: Kjell Erlandsson, River Hills, WI (US); Tmothy Beck, Caledonia, WI (US); James A. Beck, Salem, WI (US)

(73) Assignee: InSpatial LLC, Milwaukee, WI (US)

( * ) Notice: Subject to any disclaimer, the term of this patent is extended or adjusted under 35 U.S.C. 154(b) by 318 days.

(21) Appl. No.: 13/094,963

(22) Filed: Apr. 27, 2011

(51) Int. Cl.
G01L 5/04 (2006.01)
F04B 47/00 (2006.01)

(52) U.S. Cl.
USPC ...... 702/41; 702/6; 702/42; 702/44; 702/189; 73/862.543

(58) Field of Classification Search
USPC ............... 702/6, 41, 42, 44, 189; 73/862.543
See application file for complete search history.

(56) References Cited

U.S. PATENT DOCUMENTS

| | | | |
|---|---|---|---|
| 5,172,591 A | | 12/1992 | Bohon |
| 5,182,946 A | * | 2/1993 | Boughner et al. ......... 73/152.62 |
| 5,678,981 A | | 10/1997 | Dunham |
| 7,513,752 B2 | * | 4/2009 | Boone et al. ................. 417/44.1 |

OTHER PUBLICATIONS

Electromatic Equipment Co., Check-Line Cable Tension Meters, web site page illustrating a component used in the invention.

* cited by examiner

Primary Examiner — Janet Suglo
Assistant Examiner — L. Anderson
(74) Attorney, Agent, or Firm — Andrus Intellectual Property Law, LLP

(57) ABSTRACT

A load measuring system comprising a collar mounted between the two cables of the bridle on a sucker rod pump and a measuring device to determine the clamping force of the collar. When the cables are clamped together a pre-determined distance at an angle from the vertical, the load on the cables can be determined from the clamping force. The clamping force is measured by a strain gauge or other type of load cell. The load is measured and recorded at frequent intervals during the pump stroke, and by further analysis, critical operational parameters of the pump can be determined, and the information can be used to control the operation of the pump.

10 Claims, 3 Drawing Sheets

SUCKER ROD LOAD MEASUREMENT

CROSS-REFERENCE TO RELATED APPLICATIONS

Not applicable.

BACKGROUND OF THE INVENTION

The present invention relates to dynamic measurement of load on a sucker rod pump and, more particularly, to a method and apparatus for measuring the load on the sucker rod.

The most common means of artificial lift in oil wells is sucker rod pumping. The basic elements of a sucker rod pumping system are illustrated in FIG. 1. These systems include a prime mover 2, typically an electric motor, which drives a gear box and counterweight unit 4. Gear box 4 in turn drives one end of walking beam 6. The opposite end of walking beam 6 is connected to the upper end of a sucker rod string 8 via two cables connected to the walking beam. These cables are often referred to as the bridle. Sucker rod string 8 extends from the earth's surface to the actual pump 10 located at the bottom of cased well 12.

The major expenses involved in operation of a sucker rod pumping system are the electrical power input needed for motor 2 and expenses of repairing pumps that fail. It is desirable to pump at the highest rate possible to maximize oil production without allowing the pump to go dry which can cause mechanical failure of the pump 10. Various adjustments can be made to the motor speed, counterweight and stroke length to optimize production while minimizing energy use and breakdowns.

The operation of the sucker rod pumping system is optimized using a dynamometer, a device which records load versus displacement during the pumping cycle. Electronic dynamometers are becoming more common. Electronic dynamometers, especially when coupled with computers, greatly speed analysis. On high production wells, dedicated electronic dynamometers, or pump-off controllers, are sometimes used to continuously monitor pumping unit operation, thus assuring maximum performance and minimizing failures.

The primary input to a dynamometer or pump-off controller is the time varying load on the sucker rod string, and in particular, to the polished rod portion positioned at the upper end of the string. Pump-off controllers typically use a permanent electronic load cell attached to the polished rod to measure rod load. These load cells are expensive and difficult to install and remove.

Clamp-on load cells have also been developed for use with portable electronic dynamometers. These load cells simply collar around the polished rod and are quickly and easily installed or removed. These devices are generally known as extensiometers, measuring the strain of the polished rod with varying load. Because they are normally installed onto the polished rod with the rod already carrying a load, they do not measure the strain resulting from pre-existing load. Thus, the collar-on load cells measure only relative load changes, not absolute loads. In order to measure absolute loads with the extensiometer-type load cell, the load, typically 5,000-10,000 pounds, must be taken off the polished rod prior to installation.

BRIEF SUMMARY OF THE INVENTION

Accordingly, an object of the present invention is to provide an improved sucker rod load measurement system which provides absolute readings of rod load without requiring that load be removed to establish zero, and which is easy to install and has a lower cost than existing load measurement systems.

Another object of the present invention is to provide a sucker rod load measurement system that may be installed by one person without special equipment.

It is a further object of the invention to provide information on pump rod position simultaneously with the load data. The combination of pump rod loads and pump rod positions provided crucial information for operation diagnostics. It also provides an indicator diagram as provided by a dynamometer and is often referred to as a dynamometer card.

The invention is also intended to provide pump rod load data so as to monitor potential rod overstress conditions, which could occur in cases when the pump gets stuck or encounters some other obstruction.

Another object of the invention is to transmit the collected data via wireless networks or other means to provide remote analysis and monitoring.

It is a further object of the system to allow the data to be used to control the operation of the oil well pump for improved production and protection of the pumping system. It will allow the pump to shut off if the fluid level in the well falls below a pre-determined level or if the pump rod is overloaded which could take place if the pump should become stuck.

According to the present invention, an improved sucker rod load measurement device includes at least one collar mounted between the bridle cables and means for measuring the clamping force of the collar. Variations in sucker rod load are determined from the variations in the force exerted on the collar.

In a preferred embodiment, a collar is attached between the cables of the bridle at a pre-determined distance from the carrier bar that connects the pair of cables, or bridle, to the polished rod. The collar is then tightened to a pre-determined horizontal distance. The resulting cable geometry is then used for vector analysis to determine the vertical load on the cables and thus the polished rod.

The apparatus includes an electronic signal connection between the load measurement system on the collar and a signal processing unit. This connection can be either an electric cable, or a radio transmitter mounted on the collar combined with a radio receiver mounted in connection with the signal processor.

DETAILED DESCRIPTION OF THE INVENTION

Figure 1:
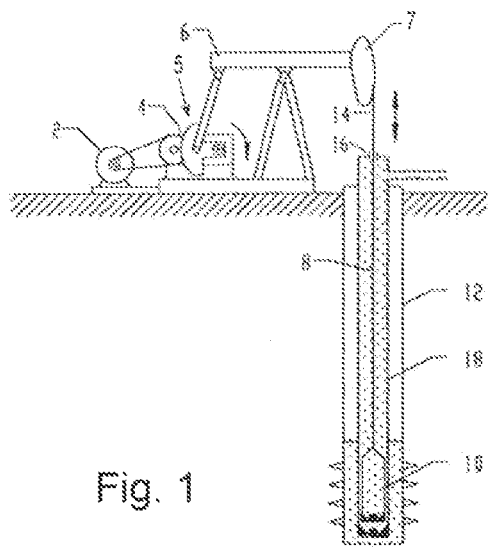
FIG. 1 is an illustration of a typical oil well sucker rod pumping system.

The basic components of a typical sucker rod pumping system are illustrated in FIG. 1 discussed above and include a prime mover 2, typically an electric motor driving a gear box 4 and associated counter weight unit 5. Gear box 4 drives one end of walking beam 6. The opposite end 7 of walking beam 6 is connected to the upper end of sucker rod string 8. The primary input needed by a dynamometer is the total load on sucker rod string 8.

The maximum loads on the sucker rod string 8 occur at its upper end 14 where it connects to the walking beam 6, since in addition to the oil being lifted, the weight of the entire rod string is carried at the top of the rod string. This portion of the string is typically a polished steel rod portion designed to make a sliding fluid-tight seal with a packing 16 at the upper end of a tubing string 18.

Figure 2:
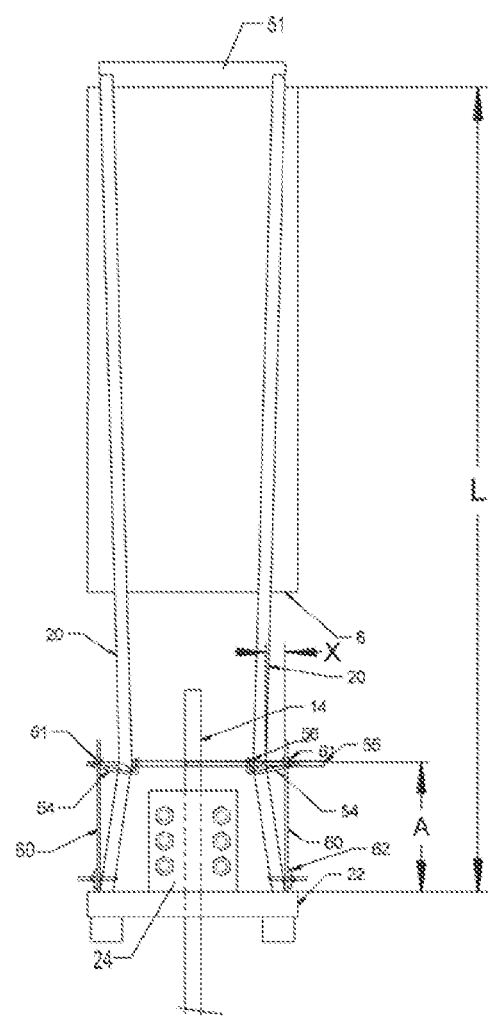
FIG. 2 is an illustration showing a front view of the cables between the walking beam and the carrier bar after the present invention is installed.

With reference to FIG. 2, the mechanical connection of the polished rod portion 14 to walking beam 6 is illustrated. Wire lines or cables 20 are connected to the polished rod by means of a carrier bar 22 and polished rod collar 24. The upper ends of wire line 20 are connected to the walking beam 6.

The present invention is based on force vector resolution when the cables connecting the walking beam 6 to the carrier bar 22 are deflected a pre-determined distance from the vertical.

Figure 3:
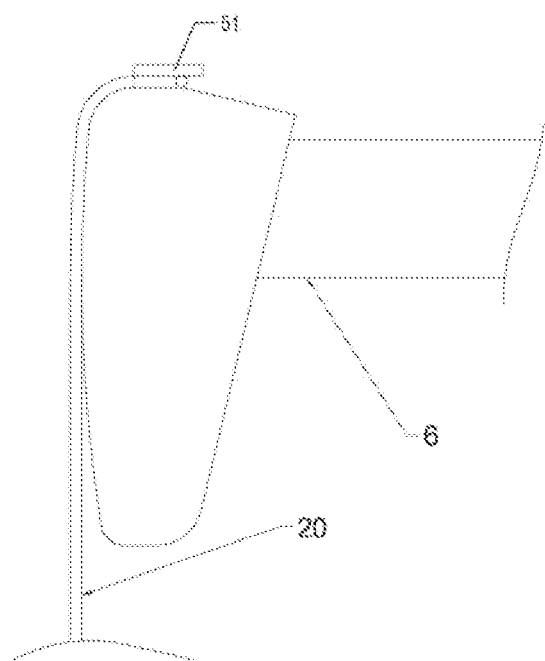
FIG. 3 is a side view of the walking beam and the cables attached to the walking beam.
Figure 4:
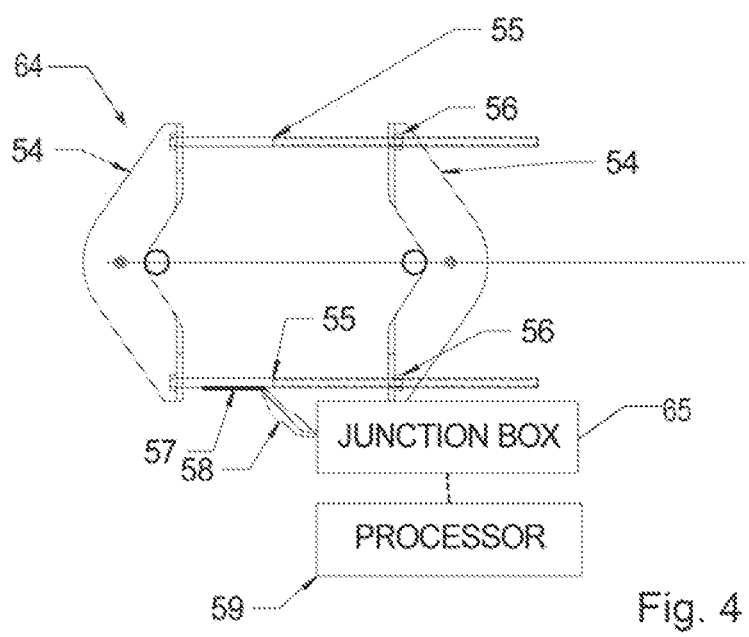
FIG. 4 is a plan view of the cable collar in the invention, mounted on the cables.

With reference to FIG. 2 and FIG. 3, a cable 20 is supported around a retainer 51 on the walking beam 6. The ends of the cable 20 are attached to the carrier bar 22. An adjustable cable collar 64 as shown in plan view in FIG. 4 is attached to the two strands of the cable 2) at a pre-determined distance (A) above the carrier bar 22 and deflects the cable 20 inward.

The cable collar 64 comprises two yoke plates 54, pulled together by two bolts 55 and nuts 56. A strain gauge 57 such as Model No. KFG-30-120-C1-11L1M2R as manufactured by Omega Engineering is mounted on one or both of the bolts 55. The electronic leads 58 of the strain gauge are then connected to a processor 59 via junction box 65, where the signals are processed to determine the stress and load on the bolt, from which the cable load is calculated. The processor 59 is located remotely to the cable collar 64 and connected to the strain gauge 57 via a cable or by radio signal transmission.

Figure 6:
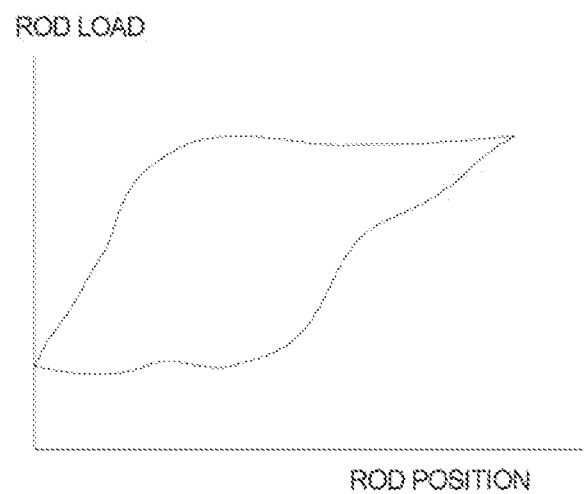
FIG. 6 shows a typical rod load vs. rod position diagram.

The signal processing unit computes the load on the polished rod based upon the signal from the strain gauges 57 attached to the bolts 55. The processing unit can be set up to shut down the pump through the pump control system when the computed load exceeds the maximum safe load for the rod string. The signal processing unit also can combine the calculated rod load and the rod position determined by the accelerometer or other position determining device mounted on the bridle to generate the dynamometer card as shown in FIG. 6. The area within the lines of the dynamometer card is an indicator how much mechanical work is being done by the pump during one stroke and thus an indicator of how much oil is lifted. If the amount of oil lifted fails below a pre-set level, the processing unit indicates that the pump is not being filled and generally that the fluid level in the well is insufficient to fill the pump. The pump drive system can then be shut off for a pre-set time period in order to allow oil to flow into the well from the oil bearing ground. After the pre-set amount of time, the pump will re-start. By combing the amount of oil lifted in each stroke of the pump and the number of strokes completed per time period, the processing unit can calculate the oil production rate of the well.

The cable collar 64 is held in fixed relation to the carrier bar 22 with rods 60 attached to the yoke plates 54 with nuts 61, and attached to the cable with clamp 62.

An accelerometer or other type of acceleration, velocity or position detector can be mounted on the collar to provide velocity and position information for the pump stroke. A typical diagram showing the relationship between load and position is referred to as a dynamometer card and is shown in FIG. 6. Analysis of the shape and enclosed area of this dynamometer card is routinely used to determine a wide range of operational parameters and conditions, such as pump fill, fluid level, condition of pump valves, gas interference and power consumption.

A modem or other transmission device can be provided to transmit the collected data over wireless networks to provide remote analysis and monitoring.

The dimensions required for the force vector analysis is shown in FIG. 2. Dimension L represents the distance from the top of the walking beam 6 to the carrier bar 22. Distance A represents the distance from the carrier bar 22 to the cable collar 24. Distance X represents the amount of horizontal cable deflection and is set by the position of nuts 56 on bolts 55.

Figure 5:
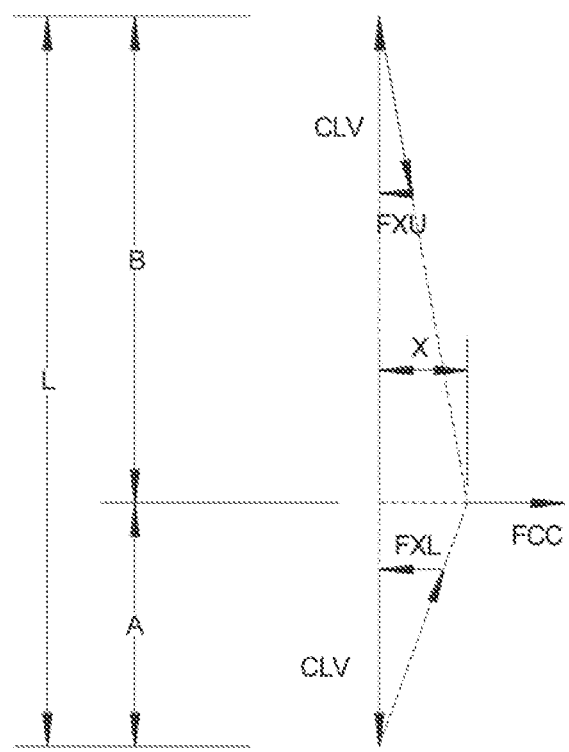
FIG. 5 shows the principal force vectors on the cable.

FIG. 5 represents the vector resolution of the forces acting on cables 20 in their deflected positions. Dimensions A, L and X represents the distances shown in FIG. 2. Force CLV represents the vertical component of the cable load, which in turn represents half the load on the polished rod, which includes the weight of the rod string to the pump at the bottom of the well, the weight of the lifted oil and friction in the system. Force FXL represents the horizontal component of the cable load at its lower attachment point at the carrier bar. Force FXU represents the horizontal component of the cable at its upper attachment point at the walking beam. FCC represents the force on the collar pulling the cables together. FCC also represents the sum of FXL and FXU.

Vector analysis shows that CLV equals FCC*X*(1/A+1/(L−A). Thus, CLV is proportional to the load on the polished rod. The load on the polished rod as it varies with the pump position in the stroke is then used to calculate pump fill percentage and fluid level in the well. This information can further be used to control the motor driving the well pump, either by shutting it down when the fluid level falls to a pre-determined level in the well, or adjust the motor and pump speed to maintain a pre-determined fluid level in the well.

What is claimed is:

1. A system for measuring a load on a sucker rod string, the sucker rod string comprising first and second cable strands secured to a walking beam, a polished rod, and a carrier bar secured to the polished rod and the first and second cable strands the system comprising:
    a cable collar attached to the first and second cable strands, the cable collar configured to horizontally deflect the first and second cable strands a set distance;
    at least one rod secured between the cable collar and the carrier bar, the rod defines a predetermined vertical distance between the carrier bar and the cable collar;
    a strain gauge secured to the cable collar wherein the strain gauge measures a horizontal force applied between the first and second cable strands to maintain the set distance; and
    a processor that receives the measured horizontal force from the strain gauge and calculates a total load on the sucker rod string up to the cable collar based upon the measured horizontal force, the predetermined vertical distance and the set distance.

2. The system of claim 1, wherein the adjustable cable collar further comprises:
    a pair of opposed yoke plates, each yoke plate configured to receive one of the first and second cable strands; and
    a pair of bolts extend between the yoke plate, the bolts adjustable to move the yoke plates relative to each other to horizontally deflect the first and second cable strands by the set distance;

wherein the strain gauge is secured to one of the pair of bolts.

3. The system of claim 2, wherein the at least one rod is a pair of rods, one rod of the pair secured to each of the yoke plates and one of the rods is secured to the first cable strand at a position near the carrier bar and an other of the rods is secured to the second cable strand at a position near the carrier bar.

4. The system of claim 2, further comprising an accelerometer secured to the cable collar, the accelerometer communicatively connected to the processor, wherein the processor calculates a position of the sucker rod string and produces a dynamometer card output based upon the calculated position and the calculated total load.

5. The system of claim 3, wherein the rods are respectively secured to the first cable strand and second cable strand with clamps.

6. The system of claim 1, wherein the processor receives the set distance of horizontal deflection of the first and second cable strands, the predetermined vertical distance between the carrier bar and the cable collar, and a predetermined vertical distance between the carrier bar and the walking beam and calculates the total load based upon these received values.

7. A system for measuring a load on a sucker rod string, the sucker rod string comprising first and second cable strands secured to a walking beam, a polished rod, and a carrier bar secured to the polished rod and the first and second cable strands, the system comprising:
a first yoke plate configured to receive the first cable strand;
a first rod secured to the first yoke plate, the first rod configured to engage the carrier bar to establish a predetermined vertical distance between the carrier bar and the first yoke plate;
a second yoke plate configured to receive the second cable strand;
a second rod secured to the second yoke plate, the second rod configured to engage the carrier bar to establish the predetermined vertical distance between the carrier bar and the second yoke plate;
at least two nut and bolt assemblies that adjustably secure the first yoke plate to the second yoke plate, wherein the at least two nut and bolt assemblies are adjusted to horizontally displace the first and second cable strands by a set distance;
a strain gauge secured to one of the nut and bolt assemblies, the strain gauge measures a horizontal force on the nut and bolt assembly between the first and second cable strand to horizontally displace the first and second cable strands by the set distance; and
a processor communicatively connected to the strain gauge and receives the horizontal force, the set distance, the predetermined vertical distance, and a vertical distance between the carrier bar and the walking beam, the processor calculates the load on the sucker rod string from the received horizontal force, set distance, and the predetermined vertical distance.

8. The system of claim 7, wherein the processor produces an indication of a pump operation from the calculated load.

9. The system of claim 7, wherein the first and second yoke plates define the set distance.

10. The system of claim 7, further comprising an accelerometer secured to at least one of the first and second yoke plates, the accelerometer communicatively connected to the processor, wherein the processor calculates a position of the sucker rod string based upon a value from the accelerometer.

* * * * *